(12) United States Patent
Nayebi et al.

(10) Patent No.: US 9,918,317 B2
(45) Date of Patent: Mar. 13, 2018

(54) APPARATUS CONFIGURED TO APPROXIMATE A POWER COEFFICIENT IN A CELL-FREE MASSIVE MIMO WIRELESS SYSTEM AND METHOD OF PERFORMING SAME

(71) Applicant: Alcatel-Lucent USA Inc., Murray Hill, NJ (US)

(72) Inventors: Elina Nayebi, New Providence, NJ (US); Alexei Ashikhmin, Morristown, NJ (US); Thomas Louis Marzetta, Summit, NJ (US); Hong Yang, Ledgewood, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 15/205,331

(22) Filed: Jul. 8, 2016

(65) Prior Publication Data

US 2018/0014305 A1    Jan. 11, 2018

(51) Int. Cl.

| H04B 7/02 | (2017.01) |
|---|---|
| H04W 72/04 | (2009.01) |
| H04B 7/0413 | (2017.01) |
| H04B 7/06 | (2006.01) |
| H04B 7/0456 | (2017.01) |
| H04W 72/02 | (2009.01) |

(52) U.S. Cl.
CPC ...... *H04W 72/0473* (2013.01); *H04B 7/0413* (2013.01); *H04B 7/0456* (2013.01); *H04B 7/0626* (2013.01); *H04W 72/042* (2013.01); *H04W 72/02* (2013.01); *H04W 72/04* (2013.01)

(58) Field of Classification Search
CPC .............................. H04W 72/02; H04W 72/04
USPC ............................................ 375/267; 370/329
See application file for complete search history.

(56) References Cited

U.S. PATENT DOCUMENTS

| 2008/0130730 | A1* | 6/2008 | Chapman ............ H04L 25/0218 375/227 |
|---|---|---|---|
| 2011/0044193 | A1* | 2/2011 | Forenza ................. H04B 7/024 370/252 |
| 2012/0195264 | A1* | 8/2012 | Taoka .................. H04B 7/0434 370/328 |
| 2013/0070621 | A1 | 3/2013 | Marzetta et al. |
| 2014/0307594 | A1* | 10/2014 | Marzetta ............... H04W 16/32 370/280 |
| 2015/0098444 | A1* | 4/2015 | Marzetta ............... H04L 5/0073 370/331 |

(Continued)

OTHER PUBLICATIONS

International Search Report dated Oct. 11, 2017 for International Application No. PCT/US2017/040693.

(Continued)

*Primary Examiner* — Leila Malek
(74) *Attorney, Agent, or Firm* — Harness, Dickey & Pierce, P.L.C.

(57) ABSTRACT

A central node may include a processor configured to empirically compute an approximation of power coefficients based on estimates of the channel coefficients such that a same one of the approximation of the power coefficient is assigned to each of a plurality of access terminals (ATs), and transmit components of a signal vector to associated access points (APs), the signal vector being based on at least the approximation of the power coefficient.

20 Claims, 4 Drawing Sheets

(56) References Cited

U.S. PATENT DOCUMENTS

2015/0365859 A1* 12/2015 Dalsgaard ........... H04W 76/048
370/331

OTHER PUBLICATIONS

Nayebi Elina et al., "Cell-Free Massive MIMO Systems", 2015 49th Asilomar Conference on Signals, Systems and Computers, IEEE, Nov. 8, 2015, pp. 695-699, XP032874351.
Hien Quoc Ngo et al., "Cell-Free Massive MIMO versus Small Cells", Arxiv.org, Cornell University Library, 201 Olin Library Cornell University, Ithaca, NY 14853, Feb. 26, 2016, XP08068145, pp. 2.
Nayebi Elina et al., "Precoding and Power Optimization in Cell-Free Massive MIMO Systems", IEEE Transactions on Wireless Communications, IEEE Service Center, Piscataway, NJ, vol. 16, No. 7, Jul. 1, 2017, p. 4445-4459, XP011656189.

* cited by examiner

APPARATUS CONFIGURED TO APPROXIMATE A POWER COEFFICIENT IN A CELL-FREE MASSIVE MIMO WIRELESS SYSTEM AND METHOD OF PERFORMING SAME

BACKGROUND

1. Field

Example embodiments relate generally to an apparatus configured to improve (or, alternatively, optimize) transmit power in a massive Multi-Input Multi-Output (MIMO) wireless system, a system and/or a method of performing the same.

2. Related Art

A massive MIMO system is capable of achieving relatively high spectral and energy efficiency through the use of a relatively large number of small service antenna access points (APs), each of which serves a relatively small number of autonomous user access terminals (AT). A massive MIMO system may be "cell-free", in which the system is not partitioned into cells. Rather, each of the ATs may be served simultaneously by more than one of the APs with the goal of providing uniformly good service to all of the ATs.

In cell-free massive MIMO systems, the APs may form their transmitted downlink signals by precoding the signals taking into account channel coefficients between the AP and the ATs.

In accordance with time division duplex (TDD) protocols, in order to estimate the channel coefficients, the ATs may synchronously and simultaneously transmit their pilot sequences to all APs. Each AP may use the pilot sequences to estimate the channel coefficients between itself and each AT, and use the estimated channel coefficients to transmit downlink signals to the ATs. High throughput in such a wireless communications system is achieved due to constructive summation of signals transmitted by different APs to each AT.

SUMMARY

In at least some example embodiments, when precoding the signals using the channel coefficients, a power coefficient of the precoded signals is determined (or, alternatively, optimized) to reduce (or, alternatively, eliminate) interference between pilot sequences, and, thus, increase the quality of the estimate of the channel coefficients, which further leads to uniformly high throughput for all ATs, as exampled by the use of max-min criterion for choosing power coefficients.

Some example embodiments relate to a central node configured to control a plurality of access points (APs), the plurality of APs configured to transmit signals to a plurality of access terminals (ATs).

In some example embodiments, the central node includes a memory and a processor, the memory containing computer readable code that, when executed by the processor, configures the processor to, empirically compute an approximation of power coefficients based on estimates of the channel coefficients such that a same one of the approximation of the power coefficient is assigned to each of the plurality of ATs, and transmit components of a signal vector to associated ones of the APs, the signal vector being based on at least the approximation of the power coefficient.

In some example embodiments, the central node is connected to the APs via a cell-free massive Multi-Input Multi-Output (MIMO) wireless network.

In some example embodiments, the computer readable code, when executed, further configures the processor to, receive, via a backhaul channel, the estimates of channel coefficients from the APs, compute an approximate channel matrix based on the estimates of the channel coefficients such that the approximate channel matrix is a matrix of the estimates of the channel coefficients, compute a precoding matrix based on the approximate channel matrix and the approximation of the power coefficients, and compute the signal vector based on the precoding matrix In some example embodiments, the computer readable code, when executed, further configures the processor to, determine an initial precoding matrix based on the estimates of channel coefficients such that the initial precoding matrix is configured to reverse an effect of the approximate channel matrix.

In some example embodiments, the computer readable code, when executed, further configures the processor to compute the approximation of the power coefficient using an approximation vector $\delta_m = \text{diag}\{E((\hat{G}^T \hat{G}^*)^{-1} \hat{g}_{[m]} \hat{g}_{[m]}^H (\hat{G}^T \hat{G}^*)^{-1})\}$, where $m=1, \ldots M$, M is a number of the APs, diag is a main diagonal of a matrix, $E(\ )$ is the operator of expectation, $\hat{G}$ is the approximate channel matrix, $\hat{G}^T$ is a transpose of the approximate channel matrix $\hat{G}$, and $\hat{G}$ is the Hermitian conjugate of the approximate channel matrix $\hat{G}$.

In some example embodiments, the computer readable code, when executed, further configures the processor to compute the expectation based on multiple realizations of the approximate channel matrix using exponential smoothing.

In some example embodiments, the computer readable code, when executed, further configures the processor to compute, for each of the APs, a sum by adding components of the approximation vector.

In some example embodiments, the computer readable code, when executed, further configures the processor to, select a largest one of the sums $\lambda_m$ as a leading power coefficient, and set an inverse of the largest one of the sums as the approximation of the power coefficient associated with each of the ATs.

In some example embodiments, the central node is configured to transmit components of the signal vector to associated ones of the APs such that the APs are configured to precode forward link signals destined for the ATs based on the components of the signal vector.

In some example embodiments, the processor empirically computes the approximation of the power coefficient such that errors in the estimates of the channel coefficients are ignored.

In some example embodiments, the central node is configured to, compute the signal vector based on the approximate channel matrix and the approximation of the power coefficient such that messages for one of the ATs do not interfere with messages for other ones of the ATs, and compute the approximation of the power coefficient such that an average transmit power associated with each of the APs is less than or equal to an allowed power $P_f$ associated with the APs.

Some example embodiments relate to method of operating a central node to control a plurality of access points (APs), the plurality of APs configured to transmit signals to a plurality of access terminals (ATs).

In some example embodiments, the method includes empirically computing an approximation of power coefficients based on estimates of the channel coefficients such that a same one of the approximation of the power coefficient is assigned to each of the plurality of ATs; and transmitting components of a signal vector to associated ones of the APs, the signal vector being based on at least the approximation of the power coefficient.

In some example embodiments, the method further includes receiving, via a backhaul channel, the estimates of the channel coefficients from the APs; computing an approximate channel matrix based on the estimates of the channel coefficients such that the approximate channel matrix is a matrix of the estimates of the channel coefficients; computing a precoding matrix based on the approximate channel matrix and the approximation of the power coefficients, and computing the signal vector based on the precoding matrix.

In some example embodiments, the empirically computing computes the approximation of the power coefficient such that errors in the estimates of the channel coefficients are ignored, and the empirically computing includes computing the approximation of the power coefficient using an approximation vector $\delta_m = \text{diag}\{E((\hat{G}^T \hat{G}^*)^{-1} \hat{g}_{[m]} \hat{g}_{[m]}^H (\hat{G}^T \hat{G}^*)^{-1})\}$, where m=1, ... M, M is a number of the APs, diag is a main diagonal of a matrix, $E()$ is the operator of expectation, $\hat{G}$ is the approximate channel matrix, $\hat{G}^T$ is a transpose of the approximate channel matrix $\hat{G}$, and $\hat{G}^*$ is the Hermitian conjugate of the approximate channel matrix $\hat{G}$.

Some example embodiments relate to a system.

In some example embodiments, the system includes a plurality of access point (APs) configured to compute estimates of channel coefficients between a respective one of the APs and each of a plurality of access terminals (ATs) based pilot signals associated therewith; and a central node (CN) connected to the plurality of APs via a backhaul channel, the CN configured to, empirically compute an approximation of power coefficients based on the estimates of the channel coefficients such that a same one of the approximation of the power coefficient is assigned to each of the plurality of ATs, and transmit components of a signal vector to associated ones of the APs, the signal vector being based on at least the approximation of the power coefficient.

In some example embodiments, the APs are configured to, measure the pilot signals received from the ATs, compute the estimates of the channel coefficients using the received pilot signals, and transmit, via the backhaul channel, the estimates of the channel coefficients to the CN.

In some example embodiments, the CN is configured to, receive, via a backhaul channel, the estimates of channel coefficients from the access points (APs), compute an approximate channel matrix based on the estimates of the channel coefficients such that the approximate channel matrix is a matrix of the estimates of the channel coefficients, compute a precoding matrix based on the approximate channel matrix and the approximation of the power coefficient, and compute the signal vector based on the precoding matrix.

In some example embodiments, the CN is further configured to, determine an initial precoding matrix based on the estimates of channel coefficients such that the initial precoding matrix is configured to reverse an effect of the approximate channel matrix, and compute the approximation of the power coefficient such that errors in the estimates of the channel coefficients are ignored, and using an approximation vector $\delta_m = \text{diag}\{E((\hat{G}^T \hat{G}^*)^{-1} \hat{g}_{[m]} \hat{g}_{[m]}^H (\hat{G}^T \hat{G}^*)^{-1})\}$, where m=1, ... M, M is a number of the APs, diag is a main diagonal of a matrix, $E()$ is the operator of expectation, $\hat{G}$ is the approximate channel matrix, $\hat{G}^T$ is a transpose of the approximate channel matrix $\hat{G}$, and $\hat{G}^*$ is the Hermitian conjugate of the approximate channel matrix $\hat{G}$.

In some example embodiments, the APs and the CN are connected to a cell-free massive Multi-Input Multi-Output (MIMO) wireless network.

In some example embodiments, the APs are configured to one of (i) precode forward link signals based on the components of the signal vector, and (ii) receive the forward link signals precoded by the CN based on the components of the signal vector.

BRIEF DESCRIPTION OF THE DRAWINGS

At least some example embodiments will become more fully understood from the detailed description provided below and the accompanying drawings, wherein like elements are represented by like reference numerals, which are given by way of illustration only and thus are not limiting of example embodiments and wherein.

DETAILED DESCRIPTION OF EXAMPLE EMBODIMENTS

Figure 1:
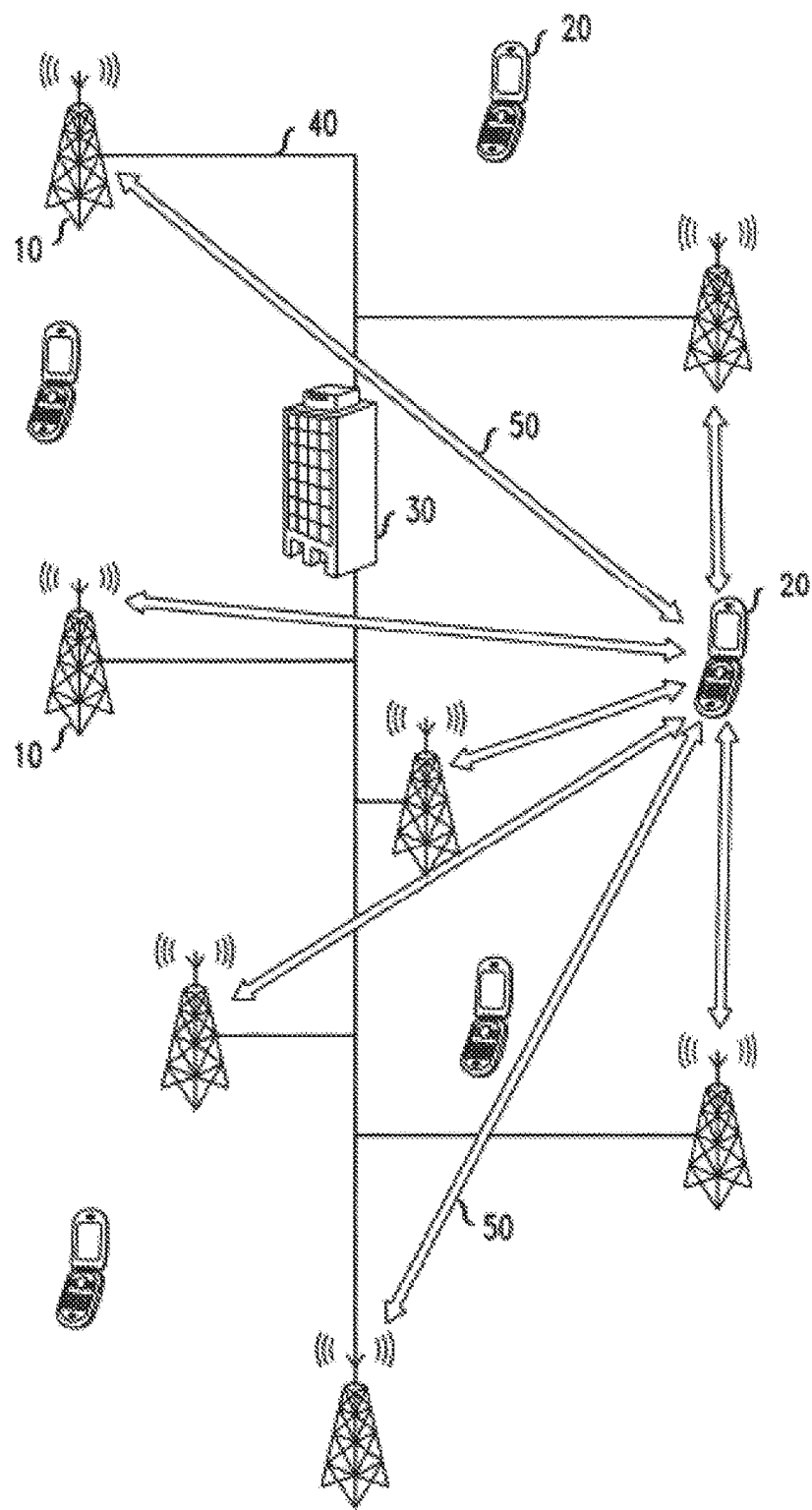
FIG. 1 illustrates a simplified schematic diagram of a network illustrating forward and reverse propagation channels between a selected one of the ATs and a population of service antennas according to example embodiments.

Various example embodiments will now be described more fully with reference to the accompanying drawings in which some example embodiments are shown.

Detailed illustrative embodiments are disclosed herein. However, specific structural and functional details disclosed herein are merely representative for purposes of describing at least some example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of example embodiments. Like numbers refer to like elements throughout the description of the figures. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments are discussed herein as being implemented in a suitable computing environment. Although not required, example embodiments will be described in the general context of computer-executable instructions, such as program modules or functional processes, being executed by one or more computer processors or CPUs. Generally, program modules or functional processes include routines, programs, objects, components, data structures, etc. that performs particular tasks or implement particular abstract data types.

In the following description, illustrative embodiments will be described with reference to acts and symbolic representations of operations (e.g., in the form of flowcharts) that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example: existing radio access network (RAN) elements, such as eNodeBs; and/or existing Evolved Packet Core (EPC) network elements, such as mobile management entities (MMEs), packet data network (PDN) gateways (PGWs), serving gateways (SGWs), servers, etc. Such existing hardware may include one or more Central Processing Units (CPUs), system-on-chip (SOC) devices, digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example: Massive Multiple-Input-Multiple-Output (MIMO) network elements, such as Massive MIMO central nodes, Massive MIMO base stations, etc. Such existing hardware may include one or more Central Processing Units (CPUs), system-on-chip (SOC) devices, digital signal processors (DSPs), application-specific-integrated-circuits (ASICs), field programmable gate arrays (FPGAs), computers, or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "Massive MIMO base station" may be considered synonymous to, and may hereafter be occasionally referred to as a base station, NodeB, eNodeB, eNB, transceiver station, base transceiver station (BTS), etc. A Massive MIMO base station provides wireless resources for users within a geographical coverage area (also referred to as a cell). As discussed herein, the Massive MIMO base station may have all functionally associated with conventional Massive MIMO base stations in addition to the capability and functionality to perform the methods discussed herein.

The term "user" as discussed herein, may be considered synonymous to, and may hereafter be occasionally referred to, as user equipment (UE), client, mobile unit, mobile station, mobile user, mobile, subscriber, user, remote station, access terminal, receiver, etc., and describes a remote user of wireless resources in a wireless communications network, such as a massive MIMO network.

As used herein, the term "central node" is a Massive MIMO network entity that controls a plurality of Massive MIMO base stations. The central node may be a separate network entity at one level higher hierarchical order than the Massive MIMO base stations, or may reside within a particular Massive MIMO base station. As discussed herein, the central node may have all functionally associated with conventional massive MIMO central nodes in addition to the capability and functionality to perform the methods discussed herein.

According to example embodiments, existing Massive MIMO base stations, Massive MIMO central nodes, etc., may be (or include) hardware, firmware, hardware executing software or any combination thereof. Such hardware may include one or more CPUs, SOC devices, DSPs, ASICs, FPGAs, computers, or the like, configured as special purpose machines to perform the functions described herein as well as any other well-known functions of these elements. In at least some cases, CPUs, SOCs, DSPs, ASICs and FPGAs may generally be referred to as processing circuits, processors and/or microprocessors.

In more detail, for example, as discussed herein Massive MIMO base stations, massive MIMO central nodes, etc., may be implemented as any physical computer hardware system including one or more processors, various interfaces, a computer readable medium, and (optionally) a display device. The one or more interfaces may be configured to transmit/receive (wireline or wirelessly) data signals to/from one or more other network elements or users; and to transmit/receive (wireline or wirelessly) control signals to/from other network elements or users. In at least one example, the functionality of the existing Massive MIMO base stations, Massive MIMO central nodes, etc., may be executed on the one or more processors and the various interfaces.

FIG. 1 illustrates a simplified schematic diagram of a network illustrating forward and reverse propagation channels between a selected one of the ATs and a population of service antennas according to example embodiments.

Referring to FIG. 1, a population of access points (APs) 10 may be serve a population of ATs 20. The APs 10 may be connected to each other, and to a central node 30, over a backhaul network 40. The backhaul network 40 may be a fixed, landline network such as a fiber optic network. However, example embodiments are not limited thereto. For example, the backhaul network may be a wireless network. Each of the service antennas may communicate with each of the ATs 20 over a propagation channel 50 therebetween.

The cell-free Massive MIMO central node 30 may control the plurality of APs 10. The central node 30 may be a separate network entity at one level higher hierarchical order than the APs 10, or may reside within a particular one of the APs 10.

Although each AP 10 is shown, and will be discussed below, as though it comprises a single antenna element, other implementations are possible in which some or all of the APs 10 are multi-element arrays.

The APs 10 may have various configurations, ranging from full-scale cellular base station antennas and associated hardware to small, self-contained units operating with a low power budget, such as several milliwatts to several watts.

In some example embodiments, each of the APs 10 may include an antenna, radiofrequency electronic circuitry, baseband signal-processing hardware, and an interface to the backhaul network 40. Therefore, these self-contained units may be freely deployed at such density as is required to achieve a desired level of network performance.

The APs 10 may be distributed over a wide area, such as a city. For example, a network may include M randomly distributed APs 10 and K ATs 20 acting as users.

The total number of APs 10 may be equal to or greater than the number of ATs 20 that are served such that M>>K. The minimum distance between APs 10 may be greater than one-fourth (¼) the operating wavelength, so as to avoid strong correlations in the channel coefficients of neighboring APs 10.

The APs 10 may operate semi-autonomously to serve the ATs 20 without reliance on cellular boundaries such that the APs 10 perform cell-free operation, although the APs 10 population may have other modes of operation in which they are organized into cells. When performing cell-free operation, the network is not partitioned into cells, instead, each of the ATs 20 may be served simultaneously by all of the APs 10 with the goal of providing uniformly good service to all of the ATs 20.

Each of the ATs 20 may transmit orthogonal pilot sequences on the reverse link to the APs 10 to allow the APs 10 to acquire channel state information (CSI).

Each of the APs 10 may obtain an estimate of its channel coefficients by measuring pilot sequences transmitted on the reverse link by the ATs 20 and received by the APs 10.

In time-division duplex TDD operation, the forward and reverse channels are separated in time but use the same frequencies. Therefore the channel estimates for each forward link may be equal (or, alternatively, substantially equal) to the estimates for the corresponding reverse link. However, while the pilot sequences received on the reverse channel may be used to estimate the forward channel, the estimate will be valid only within a coherence interval that depends on the fading characteristics of the particular network of interest.

The coherence interval may be approximately the time for the AT 20 to travel a distance of one-fourth the operating wavelength.

For a given frequency, each channel coefficient may be expressible as a complex number having an amplitude and a phase, where the amplitude represents attenuation of the received signal due to propagation over the channel, and the phase represents time delay due to propagation over the channel. In the case of OFDM transmission, each frequency tone of a OFDM symbol may have its own channel coefficient. In all tones of an OFDM symbol, the same algorithms and protocols may be applied. In the below discussion, only one, unspecified, OFDM tone is considered. However, all other tones can be treated similarly.

The amplitudes of the channel estimates to the respective AP 10 may vary as an individual AT 20 moves through the area of coverage.

The central node 30 (or, alternatively each AP 10 individually) may linearly precode the messages destined for ATs 20 by multiplying the messages by a zero forcing pre-coding matrix $A_{ZF}$, discussed in more detail below, that is related to the channel estimate and includes power coefficients $\delta_m$ determined to increase a signal to noise ratio (SINR), thus reducing interface caused by transmissions to other ATs 20.

Figure 2:
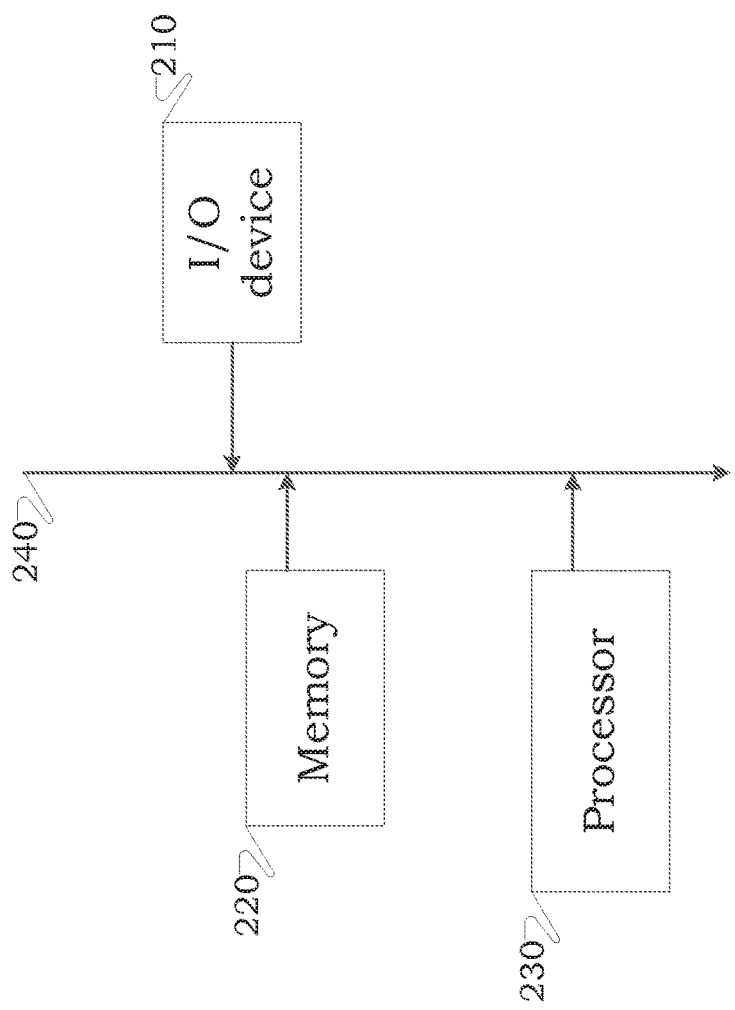
FIG. 2 illustrates a simplified schematic diagram of a selected one of the service antennas of the preceding figures according to example embodiments.

FIG. 2 is a block diagram illustrating an example embodiment of a massive MIMO access point (AP) or central node.

Referring to FIG. 2, the APs 10 and the central node 30 may each include an input/output device (I/O) device 210, a memory 220, a processor 230 and a bus 240.

The I/O device 210 included in each of the APs 10 may include a front end I/O device and a back end I/O device, while the I/O device 210 included in the central node 30 may include only a back end I/O device. However, example embodiments are not limited thereto.

The back end I/O device included in the central node 30 may be connected to the back end I/O devices 210 included in each of the APs 10, such that each of the APs 10 is connected to the central node 30 via the backhaul network 40.

The front end I/O devices 210 included in the APs 10 may include one or more antennas for sending information to the ATs 20, for example, simultaneously, in a cell-free Massive MIMO network such that each of the ATs 20 is served by multiple ones of the APs 10, for example, all of the APs 10.

The I/O devices 210 may include various interfaces including one or more transmitters/receivers (or transceivers) connected to one or more antennas to wirelessly transmit/receive control and data signals.

The memory 220 may be a computer readable storage medium that generally includes a random access memory (RAM), read only memory (ROM), and/or a permanent mass storage device, such as a disk drive. The memory 220 also stores an operating system and any other routines/modules/applications for providing the functionalities of the AP 10 and/or the central node 30. These software components may also be loaded from a separate computer readable storage medium into the memory 220 using a drive mechanism (not shown). Such separate computer readable storage medium may include a disc, tape, DVD/CD-ROM drive, memory card, or other like computer readable storage medium (not shown). In some embodiments, software components may be loaded into the memory 220 via one or more interfaces (not shown), rather than via a computer readable storage medium.

The processor 230 may be implemented by at least one semiconductor chip disposed on a printed circuit board. The processor 230 may be an arithmetic logic unit, a digital signal processor, a microcomputer, a field programmable array, a programmable logic unit, a microprocessor or any other device capable of responding to and executing instructions in a defined manner.

As discussed in more detail below, with reference to FIG. 3, the processor 230 associated with the central node 30 may be programmed with instructions that configure the processor 230 into a special purpose computer to empirically compute an approximation of power coefficients $\eta_k$ based on estimates of the channel coefficients $\hat{g}_{mk}$ such that a same one of the approximation of the power coefficient is assigned to each of the plurality of ATs 20, and transmit components $V_m$ of a signal vector $\underline{V}$ to associated ones of the APs 10, where the signal vector $\underline{V}$ is based on at least the approximation of the power coefficient $\eta_K$. Therefore, the processor 230 of the central node 30 may improve the functioning of the cell-free Massive MIMO system itself by improving the SINR of signals transmitted to the ATs 20 while reducing the computational burden on the system.

Figure 3:
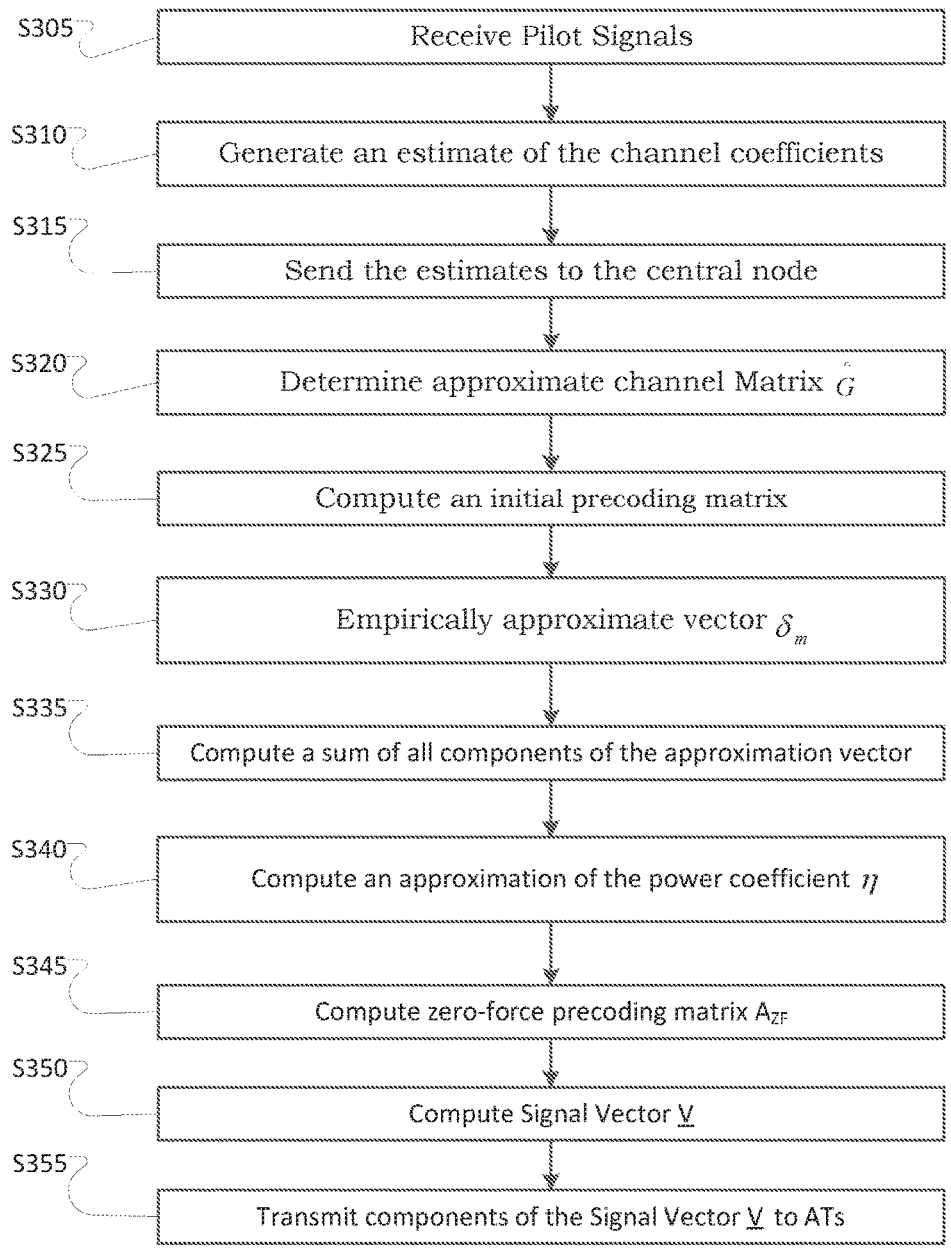
FIG. 3 illustrates a flow chart of a method of approximating a power coefficient according to example embodiments.

As will be appreciated, depending on implementation, the APs 10 and the central node 30 may each include additional components other than those shown in FIG. 3. However, it is not necessary that all of these generally conventional components be shown in order to convey illustrative example embodiments to persons having ordinary skill in the art.

The APs 10 may transmit forward link signals $\sqrt{P_f}V_m$ to the ATs 20, where $P_f$ is a transmit power. The forward link signals $\sqrt{P_f}V_m$ may contain information for many or all of the ATs 20.

The central node 30 may achieve a high Signal to Noise Ratio (SINR) for all of the ATs 20 by the determining the power coefficient $\eta_k = \eta_{k,k=1,\ldots,K}$ and the precoding matrix $A_{ZF}$ such that the average power of the forward link signal $\sqrt{P_f}V_m$ transmitted by the ATs 20 is less than or equal to an allowed power $P_f$.

FIG. 3 illustrates a flow chart of a method of approximating a power coefficient according to example embodiments.

Referring to FIG. 3, in the below Equations, $^T$, $^*$, and $^H$ may denote a transpose, complex conjugate and Hermitian transpose operations performed by the processor of the central node 30. Further, uppercase and bold systems may denote matrices and vectors respectively, E( ) may denote an expectation operation and diag{A} may denote the main diagonal elements of matrix A, "M" denotes the total number of APs 10, "m" denotes one of the APs 10, "K" denotes the total number of ATs 20, and "k" denotes one of the ATs 20.

In operation S305, each of the APs 10 may receive uplink pilot signals $\Psi_K$ from each of the K ATs 20, where the uplink pilot signals $\Psi_K$ are desired (or, alternatively, predetermined) pilot signals $\Psi_K$ broadcast from each of the ATs 20.

In operation S310, each of the M APs 10 may generate an estimate $\hat{g}_{mk}$ of the channel coefficient $g_{mk}$ between the respective $m^{th}$ AP 10 and the $k^{th}$ AT 20, k=1, ... K, where $\hat{g}_{mk}$ is a complex number. For example, the processor 230 associated with each of the APs 10 may execute computer readable instructions stored in the memory 220 that configure the processor 230 as a special purpose processor to generate the estimate $\hat{g}_{mk}$ of the channel coefficient $g_{mk}$.

The APs 10 may generate the estimate $\hat{g}_{mk}$ of the channel coefficient $g_{mk}$ using Equation 1:

$$\hat{g}_{mk} = c\Psi_k^H Y_m \qquad \text{Equation 1}$$

In Equation 1, $\Psi_k^H$ is Hermitian transpose operation performed on the uplink pilot signals $\Psi_k$, $Y_m$ is the signal received at the $m^{th}$ AP 10 and may be equal to the sum of all the uplink pilot signals $\Psi_k$ transmitted by ATs 20, and c is a constant.

In operation S315, each of the APs 10 may send the estimates $\hat{g}_{mk}$ of the channel coefficient $g_{mk}$ to the central node 30 to allow the central node 30 to compute power coefficients $\eta_k$, k=1, ..., K. For example, the processor 230 associated with each of the APs 10 may execute computer readable instructions stored in the memory 220 that configure the processor 230 as a special purpose processor to send the estimates $\hat{g}_{mk}$ of the channel coefficient $g_{mk}$ to the central node 30.

In operation S320, the central node 30 may approximate a channel matrix $\hat{G}$ to generate an approximate channel matrix $\hat{G}$ using Equation 2, where the approximate channel matrix $\hat{G}$ is an M×K matrix such that the number of rows M is equal to the number of APs 10 and number of columns K is equal to the number of ATs 20. For example, the processor 230 associated with the central node 30 may execute computer readable instructions stored in the memory 220 associated with the central node 30 that configure the processor 230 as a special purpose processor to generate the approximate channel matrix $\hat{G}$.

$$\hat{G} = \begin{bmatrix} \hat{g}_{1,1} & \cdots & \hat{g}_{1,k} \\ \vdots & \vdots & \vdots \\ \hat{g}_{M1} & \cdots & \hat{g}_{MK} \end{bmatrix} \qquad \text{Equation 2}$$

In operation S325, the central node 30 may compute an initial precoding matrix $B_{ZF}$ using Equation 3. For example, the processor 230 associated with the central node 30 may execute computer readable instructions stored in the memory 220 associated with the central node 30 that configure the processor 230 as a special purpose processor to compute the initial precoding matrix $B_{ZF}$.

$$B_{ZF} = \hat{G}^* (\hat{G}^T \hat{G}^*)^{-1} \qquad \text{Equation 3}$$

However, this initial precoding matrix $B_{ZF}$ is not limited by transmit power, and, therefore, subsequently, the central node 30 may adjust the initial precoding matrix in view of the transmit power.

To adjust the initial precoding matrix $B_{ZF}$ in view of the transmit power, the initial precoding matrix $B_{ZF}$ may be multiplied by the diagonal matrix P, having power coefficients $\sqrt{\eta_1}, \ldots \sqrt{\eta_K}$ on the diagonal of the matrix. However, in example embodiments, the central node 30 may reduce this computational complexity by perform operations S330 to S340, discussed below, assuming that each of the ATs 20 have the same power coefficient $\sqrt{\eta}$.

In operation S330, the central node 30 may empirically approximate vector $\delta_m = \text{diag}\{E((\hat{G}^T \hat{G}^*)^{-1} \hat{g}_{[m]}\hat{g}_{[m]}^H (\hat{G}^T \hat{G}^*)^{-1})\}$, where E( ) is the operator of expectation or average and $\hat{g}_{[m]}$ =channel coefficients=$(\hat{g}_{m1},...\hat{g}_{mK})$ is the $m^{th}$ row of matrix $\hat{G}$, and m=1, ... M. For example, the processor 230 associated with the central node 30 may execute computer readable instructions stored in the memory 220 associated with the central node 30 that configure the processor 230 as a special purpose processor to compute the approximation vector $\delta_m$.

The central node 30 may empirically compute the approximation vector $\delta_m$ in various ways. For example, the central node 30 may utilize exponential smoothing to determine the approximation vector $\delta_m$.

For example, if $\delta_{m,t=0} = \text{diag}\{E((\hat{G}^T \hat{G}^*)^{-1} \hat{g}_{[m]}\hat{g}_{[m]}^H (\hat{G}^T \hat{G}^*)^{-1})\}$, at time t=0, for $\hat{g}_{[m]}$ obtained at time t+1 the central node 30 may compute the new value of $\delta_{m,t=1}$ as Equation 4:

$$\delta_{m,t=1} = \alpha\delta_{m,t=0} + (1-\alpha)\delta_{m,t=0} \qquad \text{Equation 4}$$

Where $\alpha$ is a constant $0 < \alpha < 1$.

However, example embodiments are not limited thereto and the central node 30 may empirically compute the approximation vector $\delta_m$, using other methods.

In operation S335, the central node 30 may compute, for each of the APs 10, a sum $\lambda_m$ by adding components of the approximation vector $\delta_m$ using Equation 5. For example, the processor 230 associated with the central node 30 may execute computer readable instructions stored in the memory 220 associated with the central node 30 that configure the processor 230 as a special purpose processor to compute the sum $\lambda_m$.

$$\lambda_m = \sum_{i=1}^{K} \delta_{mi} \qquad \text{Equation 5}$$

Where there are K ATs 20, and $\delta_{mi}$ are entries of the approximation vector $\delta_m = (\delta_{m1}, \delta_{m2}, \ldots \delta_{mK})$.

In operation S340, the central node 30 may compute an approximation of the power coefficient $\eta_K = \eta$ using Equation 6. For example, the processor 230 associated with the central node 30 may execute computer readable instructions stored in the memory 220 associated with the central node 30 that configure the processor 230 as a special purpose processor to compute an approximation of the power coefficient $\eta$.

$$\eta = \frac{1}{\max_{m} \sum_{i=1}^{K} \delta_{mi}} \quad \text{Equation 6}$$

For example, the central node 30 may select a largest one of the sums $\lambda_m$ as a leading power coefficient, and set the largest one of the sums as the approximation of the power coefficient as the power coefficient for each of the ATs 20.

By utilizing the approximation of the power coefficients $\eta_K$, the central node 30 may determine a power coefficient $\eta$ that is virtually optimal while requiring a drastically smaller computation complexity.

In operation S345, the central node 30 may compute the zero-forcing precoding matrix $A_{ZF}$ using Equation 7. For example, the processor 230 associated with the central node 30 may execute computer readable instructions stored in the memory 220 associated with the central node 30 that configure the processor 230 as a special purpose processor to compute the zero-forcing precoding matrix $A_{ZF}$.

The precoding matrix $A_{ZF}$ may be considered zero-forcing such that the central node 30 forms the matrix such that the zero-forcing precoding matrix $A_{ZF}$ eliminates interference by choosing $A_{ZF}$ so that when $A_{ZF}$ is multiplied by the approximate channel matrix $\hat{G}$ the product is proportional to the identity matrix. Therefore, AT 20 k receives a signal that has components relevant to signals $s_k$ without components intended for other ATs 20.

In an attempt to guarantee that the zero-forcing precoding matrix $A_{ZF}$ does not violate power constraints, the central node 30 obtains the zero-forcing precoding matrix $A_{ZF}$ from the initial precoding matrix $B_{ZF}$ and the power coefficient $\eta$ as follows in Equation 7.

$$A_{ZF} = B_{ZF} * \begin{bmatrix} \sqrt{\eta_1} & 0 & \cdots & 0 \\ 0 & \sqrt{\eta_2} & \cdots & 0 \\ 0 & \vdots & \cdots & 0 \\ 0 & 0 & \cdots & \sqrt{\eta_K} \end{bmatrix} \quad \text{Equation 7}$$

Where, $B_{ZF}$ is calculated from and the channel estimates $\hat{g}_{mk}$ using Equation 3 and $\eta_k = \eta_{k,k=1}, \ldots, K$ calculated using Equation 6 such that the precoding matrix $A_{ZF}$ has M×K columns and rows, respectively, where M is the number of APs 10 and K is the number of ATs 20.

In operation S350, the central node 30 may compute a signal vector $\underline{V}$ using Equation 8. For example, the processor 230 associated with the central node 30 may execute computer readable instructions stored in the memory 220 associated with the central node 30 that configure the processor 230 as a special purpose processor to compute the signal vector $\underline{V}$.

$$\underline{V} = A_{ZF} \cdot (s_1, \ldots, s_K)^T \quad \text{Equation 8}$$

In Equation 8, $s_j$ is the message intended for AT 20 "j" such that the vector $\underline{V}$ has M components.

In operation S355, the central node 30 transmits the $m^{th}$ component of the signal vector $\underline{V}$ to the $m^{th}$ AP 10. For example, the processor 230 associated with the central node 30 may execute computer readable instructions stored in the memory 220 associated with the central node 30 that configure the processor 230 as a special purpose processor to transmit components of the signal vector $\underline{V}$ to associated ones of the APs 10.

Thereafter, the $m^{th}$ AP 10 may transmit a forward link signal $\sqrt{P_f} V_m$ to all ATs 20 simultaneously where $P_f$ is the transmit power utilized by the amplifier of the I/O device 210 of the AP 10.

By calculating the signal vector $\underline{V}$ using the same power coefficient $\eta$ for each of the ATs 20, the cell-free system may provide significant gain (5-10 fold) over a small-cell system (i.e., a system where each of the ATs 20 is served by a single AP 10) while reducing the computational load on the central node 30.

The channel coefficients $g_{mk}$ may have small variations that may be negligible for some period of time depending on the mobility of the ATs 20. Therefore, the APs 10 may utilize the same the zero-force precoding matrix $A_{ZF}$ to precode subsequent signals using Equation 8 without re-performing the calculations of Equations 1-7 for a period of time determined based on the mobility of the ATs 20.

Figure 4:
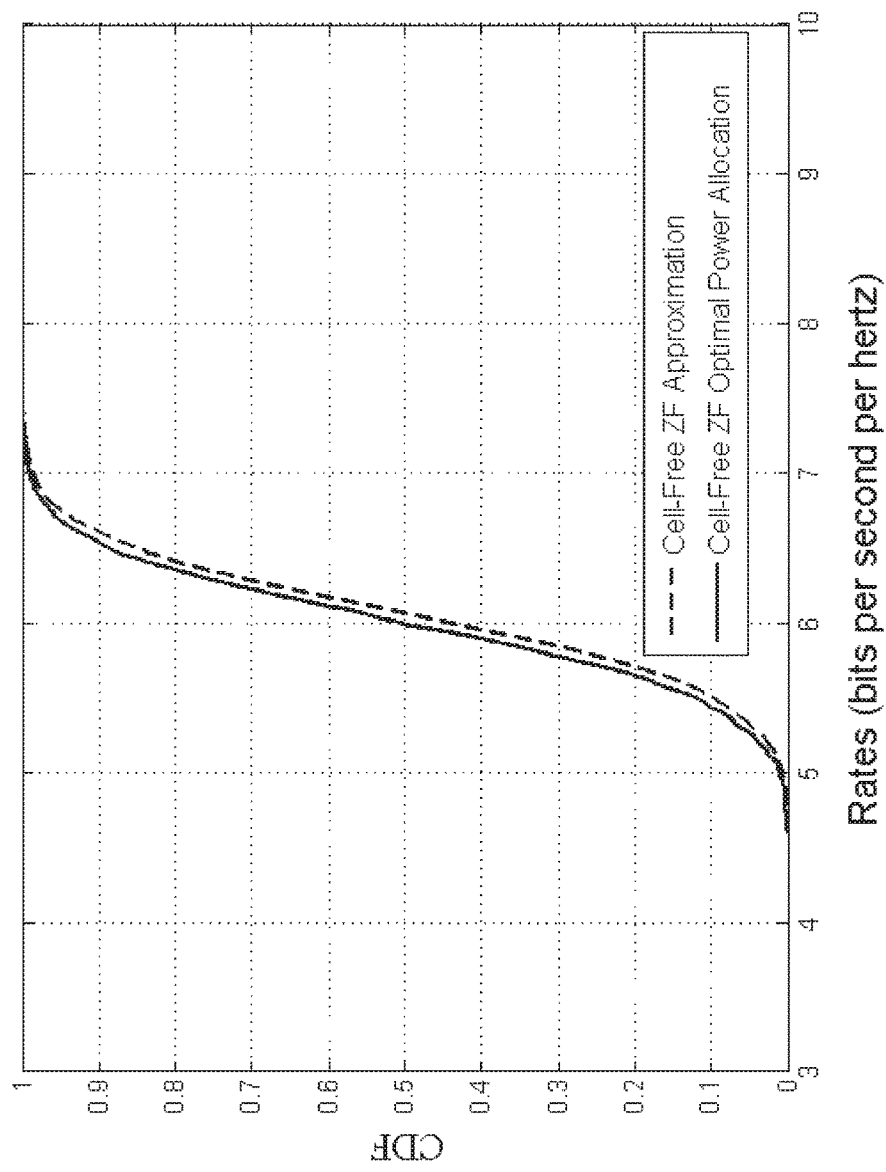
FIG. 4 illustrates experimental results of approximating a power coefficient according to example embodiments.

FIG. 4 illustrates experimental results of approximating a power coefficient according to example embodiments.

Referring to FIG. 4, the y-axis line corresponds to the cumulative distribution function (CDF) and the x-axis corresponds to transmission rate in bits per second per hertz.

As illustrated in FIG. 4, while the cell-free zero-force system using the approximation of the power coefficients $\eta_k = \eta_{k,k=1}, \ldots, K$, as indicated by solid lines, has much less computational complexity then a system operating using optimal power coefficients $\eta_1 \ldots \eta_K$ max-min power optimization, as indicated by the dashed lines, the performance of the cell-free zero-force system using the approximation of the power coefficients is virtually indistinguishable from the performance of a system using optimal max-min power coefficients.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

We claim:

1. A central node configured to control a plurality of access points (APs), the plurality of APs configured to transmit signals to a plurality of access terminals (ATs), the central node comprising:
   a memory and a processor, the memory containing computer readable code that, when executed by the processor, configures the processor to,
      empirically compute an approximation of power coefficients based on estimates of channel coefficients such that a same one of a sum of components of approximation vectors determined for respective ones the APs is utilized to assign the approximation of power coefficients for each of the plurality of ATs, and
      transmit components of a signal vector to associated ones of the APs, the signal vector being based on at least the approximation of the power coefficients.

2. The central node of claim 1, wherein the central node is connected to the APs via a cell-free massive Multi-Input Multi-Output (MIMO) wireless network.

3. The central node of claim 1, wherein the computer readable code, when executed, further configures the processor to,
   receive, via a backhaul channel, the estimates of channel coefficients from the APs, compute an approximate channel matrix based on the estimates of the channel coefficients such that the approximate channel matrix is a matrix of the estimates of the channel coefficients, compute a precoding matrix based on the approximate channel matrix and the approximation of the power coefficients, and compute the signal vector based on the precoding matrix.

4. The central node of claim 3, wherein the computer readable code, when executed, further configures the processor to, determine an initial precoding matrix based on the estimates of the channel coefficients such that the initial precoding matrix is configured to reverse an effect of the approximate channel matrix.

5. The central node of claim 4, wherein the computer readable code, when executed, further configures the processor to compute the approximation of the power coefficients using an approximation vector $\delta_m = \text{diag}\{E((\hat{G}T \ \hat{G}^*)^{-1} \hat{g}_{[m]} \hat{g}^H_{[m]} (\hat{G}T \ \hat{G}^*)^{-1})\}$, where m=1, ... M, M is a non-zero positive integer representing a number of the APs, diag is a main diagonal of a matrix, E( ) is an operator of expectation, $\hat{G}$ is the approximate channel matrix, $\hat{g}_{[m]}$ is the $m^{th}$ row of the approximate channel matrix, $\hat{g}^H_{[m]}$ is a Hermitian transpose of $\hat{g}_{[m]}$, $\hat{G}T$ is a transpose of the approximate channel matrix $\hat{G}$, and $\hat{G}^*$ is the Hermitian transpose of the approximate channel matrix $\hat{G}$.

6. The central node of claim 5, wherein the computer readable code, when executed, further configures the processor to compute the expectation based on multiple realizations of the approximate channel matrix using exponential smoothing.

7. The central node of claim 5, wherein the computer readable code, when executed, further configures the processor to compute, for each of the APs, a sum by adding components of the approximation vector.

8. The central node of claim 7, wherein the computer readable code, when executed, further configures the processor to, select a largest one of the sums $\lambda_m$ as a leading power coefficient, and set an inverse of the largest one of the sums as the approximation of the power coefficients associated with each of the ATs.

9. The central node of claim 1, wherein the central node is configured to transmit components of the signal vector to associated ones of the APs such that the APs are configured to precode forward link signals destined for the ATs based on the components of the signal vector.

10. The central node of claim 1, wherein the processor empirically computes the approximation of the power coefficients such that errors in the estimates of the channel coefficients are ignored.

11. The central node of claim 10, wherein the central node is configured to, compute the signal vector based on an approximate channel matrix and the approximation of the power coefficients such that messages for one of the ATs do not interfere with messages for other ones of the ATs, and compute the approximation of the power coefficients such that an average transmit power associated with each of the APs is less than or equal to an allowed power associated with the APs.

12. A method of operating a central node to control a plurality of access points (APs), the plurality of APs configured to transmit signals to a plurality of access terminals (ATs), the method comprising:

empirically computing an approximation of power coefficients based on estimates of channel coefficients such that a same one of a sum of components of approximation vectors determined for respective ones the APs is utilized to assign the approximation of power coefficients for each of the plurality of ATs; and transmitting components of a signal vector to associated ones of the APs, the signal vector being based on at least the approximation of the power coefficients.

13. The method of claim 12, further comprising:

receiving, via a backhaul channel, the estimates of the channel coefficients from the APs;

computing an approximate channel matrix based on the estimates of the channel coefficients such that the approximate channel matrix is a matrix of the estimates of the channel coefficients;

computing a precoding matrix based on the approximate channel matrix and the approximation of the power coefficients, and computing the signal vector based on the precoding matrix.

14. The method of claim 12, wherein the empirically computing computes the approximation of the power coefficients such that errors in the estimates of the channel coefficients are ignored, and the empirically computing comprises:

computing the approximation of the power coefficients using an approximation vector $\delta_m = \text{diag}\{E((\hat{G}T \ \hat{G}^*)^{-1} \hat{g}_{[m]} \hat{g}^H_{[m]} (\hat{G}T \ \hat{G}^*)^{-1})\}$, where m=1, ... M, M is a non-zero positive integer representing a number of the APs, diag is a main diagonal of a matrix, E( ) is an operator of expectation, $\hat{G}$ is the approximate channel matrix, $\hat{g}_{[m]}$ is the $m^{th}$ row of the approximate channel matrix, $\hat{g}^H_{[m]}$ is a Hermitian transpose of $\hat{g}_{[m]}$, $\hat{G}T$ is a transpose of an approximate channel matrix $\hat{G}$, and $\hat{G}^*$ is the Hermitian transpose of the approximate channel matrix $\hat{G}$.

15. A system comprising:

a plurality of access point (APs) configured to compute estimates of channel coefficients between a respective one of the APs and each of a plurality of access terminals (ATs) based on pilot signals associated therewith; and a central node (CN) connected to the plurality of APs via a backhaul channel, the CN configured to, empirically compute an approximation of power coefficients based on the estimates of the channel coefficients such that a same one of a sum of components of approximation vectors determined for respective ones the APs is utilized to assign the approximation of power coefficients for each of the plurality of ATs, and transmit components of a signal vector to associated ones of the APs, the signal vector being based on at least the approximation of the power coefficients.

16. The system of claim 15, wherein the APs are configured to, measure the pilot signals received from the ATs, compute the estimates of the channel coefficients using the pilot signals, and transmit, via the backhaul channel, the estimates of the channel coefficients to the CN.

17. The system of claim 15, wherein the CN is configured to,
- receive, via a backhaul channel, the estimates of the channel coefficients from the access points (APs),
- compute an approximate channel matrix based on the estimates of the channel coefficients such that the approximate channel matrix is a matrix of the estimates of the channel coefficients,
- compute a precoding matrix based on the approximate channel matrix and the approximation of the power coefficients, and
- compute the signal vector based on the precoding matrix.

18. The system of claim 17, wherein the CN is further configured to,
- determine an initial precoding matrix based on the estimates of the channel coefficients such that the initial precoding matrix is configured to reverse an effect of the approximate channel matrix, and
- compute the approximation of the power coefficients such that errors in the estimates of the channel coefficients are ignored, and using an approximation vector $\delta_m = \text{diag}\{E((\hat{G}T\ \hat{G}^*)^{-1}\hat{\vartheta}_{[m]}\hat{\vartheta}^H_{[m]}(\hat{G}T\ \hat{G}^*)^{-1})\}$, where m=1, ... M, M is a non-zero positive integer representing a number of the APs, diag is a main diagonal of a matrix, E( ) is an operator of expectation, $\hat{G}$ is the approximate channel matrix, $\hat{\vartheta}_{[m]}$ is the $m^{th}$ row of the approximate channel matrix, $\hat{\vartheta}^H_{[m]}$ is a Hermitian transpose of $\hat{\vartheta}_{[m]}$, $\hat{G}T$ is a transpose of the approximate channel matrix $\hat{G}$, and $\hat{G}^*$ is the Hermitian transpose of the approximate channel matrix $\hat{G}$.

19. The system of claim 15, wherein the APs and the CN are connected via a cell-free massive Multi-Input Multi-Output (MIMO) wireless network.

20. The system of claim 15, wherein the APs are configured to one of (i) precode forward link signals based on the components of the signal vector, and (ii) receive the forward link signals precoded by the CN based on the components of the signal vector.

* * * * *